March 3, 1970 SHIROSHI NAKAZAWA 3,498,578
POCKET-MIRROR

Filed March 31, 1967 2 Sheets-Sheet 1

BY Shiroshi Nakazawa

INVENTOR.

March 3, 1970  SHIROSHI NAKAZAWA  3,498,578
POCKET-MIRROR

Filed March 31, 1967  2 Sheets-Sheet 2

Shiroshi Nakazawa
INVENTOR.

BY George B. Oujevolk
Attorney

United States Patent Office 3,498,578
Patented Mar. 3, 1970

3,498,578
POCKET-MIRROR
Shiroshi Nakazawa, 2–20–21 Chuo, Edogawa-ku,
Tokyo-to, Japan
Filed Mar. 31, 1967, Ser. No. 627,502
Claims priority, application Japan, Mar. 31, 1966,
41/29,154
Int. Cl. A47g 1/16; A47f 7/14
U.S. Cl. 248—472                                     1 Claim

ABSTRACT OF THE DISCLOSURE

The invention of this application relates to a pocket-mirror of the versatile type which can also be used as a desk-type mirror and which comprises a circular mirror member, and two upper and lower semi-circular frame members forming a framework around said circular mirror member and journalled at their ends to the mirror member at two diametrically opposed points on its periphery, said frame member serving as grip means having a decorative function, one of said semi-circular frame members being pivotally moved to serve as rockable support means thereby enabling the pocket-mirror to be used as a desk-type mirror.

---

The present invention relates to a mirror. More particularly it relates to a pocket-mirror of the versatile type which can also be used as a desk-type mirror.

The object of the invention is to provide a pocket-mirror of such type which comprises a circular mirror member, and two upper and lower semi-circular frame members forming a framework around said circular mirror member and journalled at their ends to the mirror member at two diametrically opposed points on its periphery, said frame member serving as grip means having a decorative function, one of said semi-circular frame members being pivotally moved to serve as rockable support means thereby enabling the pocket-mirror to be used as a desk-type mirror. This mirror is characterized in that each of said two semi-circular frame members is formed with a relatively substantial width and an outer peripheral side surface suitably configured to be carried in a pocket or the like, and that the distance between the journalled ends of each semi-circular frame member is shorter than the distance between said two radially opposite points on the periphery of said mirror member, whereby said journalled ends of each frame member are maintained in press contact with the peripheral side of the mirror member by the inward resilient force due to the expansion distortion at the journalled end portions of the frames. Moreover the resilient force is kept strong and durable by the specific configuration of the frame members.

According to the present invention, the substantial width of the frame members facilitates the decorative treatment over the peripheral surfaces and other portions thereof. Moreover, the great surface area of the frame members serving as grip means effectively prevents the mirror surfaces to be inadvertently stained by the user's fingers or injured by accident or the like. In addition to these practical advantages, the frame members having such great surface area serve to create a dignified or luxurious appearance of the whole mirror. Also, the great surface area as well as the semi-circular shape, of the frame members, serves to reinforce the whole edge frame structure and increase the inward resilient force, which in turn acts to prevent one of the frame members from buckling due to any slack caused in the journalled end portions thereof. This leads to a remarkable effect that any selected position of the frame member can be maintained when the mirror is used either as a pocket-mirror or as a desk-type mirror.

The invention will be described in greater detail with reference to the accompanying drawings taken of an embodiment thereof, wherein.

Figure 1:
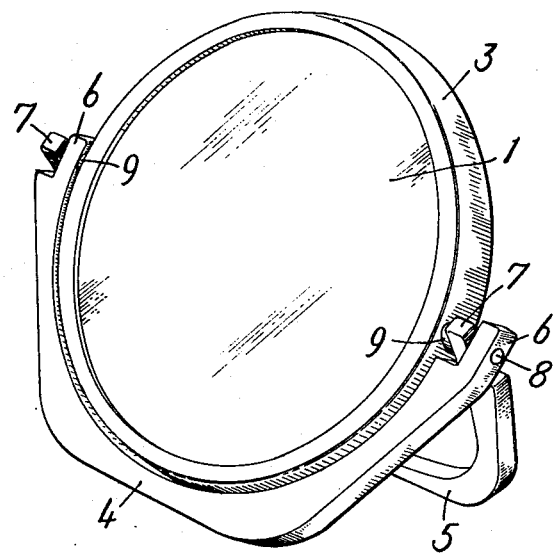
FIG. 1 is a front view of the mirror according to the present invention as it is in the position as a desk-type mirror.
Figure 2:
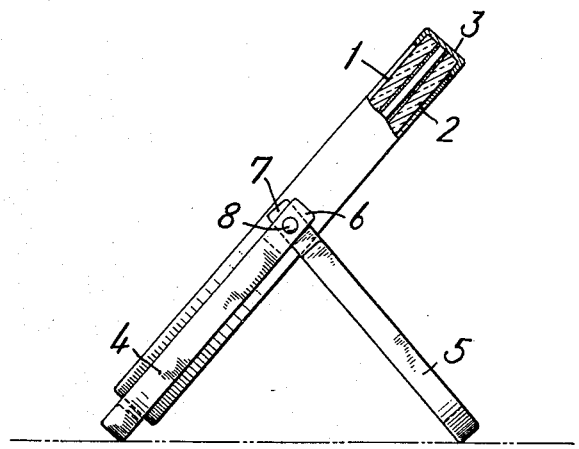
FIG. 2 is a side view thereof showing one of the frame members being in the open or supporting position.
Figure 3:
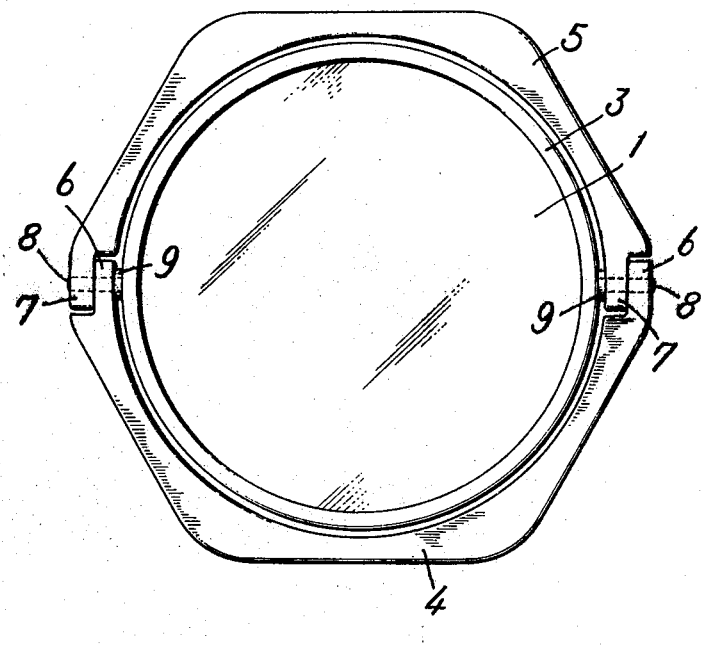
FIG. 3 is a front view of the mirror as it is in the position as a pocket-mirror with said one frame member being in the closed position.

Referring to the drawings, a circular mirror member has a front mirror surface 1 which is an ordinary mirror surface and a back mirror surface 2 which is a magnifying mirror surface. A complementary circular edge ring 3 is closely and tightly fitted around the periphery of the circular mirror member. A lower semi-circular frame member 4 is shown as having a semi-circular inner periphery and a substantially trapezoidal outer periphery with rounded corners. An upper semi-circular frame member 5 is also shown as having the same shape as the lower frame member 4. Each trapezoid of the outer periphery is equilateral so that the upper and lower frame members cooperate with each other to form a substantially regular hexagon in the outer periphery thereof when they are brought into the closed position around the mirror member, as best seen in FIG. 3. Both of these frame members have a substantial surface area, and they are journalled at their respective ends, 6, 6 and 7, 7, in overlapping relation to each other, to the peripheral side surface of the mirror member at two diametrically opposed points thereon. The journalling of the two frame members is made by means of shaft 8 projected outwardly of the edge ring 3 at said two diametrically opposed points on the periphery thereof. Resilient washers 9, 9 are provided between the edge ring 3 and each one of the journalled ends 6, 6 and 7, 7 of the frame members 4 and 5. As shown in FIGS. 1 and 3, the journalled ends of the two frame members are positioned in such a manner that one end of the frame member 4 is located internally of the adjacent end of the other frame member 5 while the other end of the frame member 4 is located externally of the adjacent end of the frame member 5. For example, the left end 6 of the frame member 4 is located internally of the left end 7 of the frame member 5 while the right end 6 of the former frame is located externally of the latter frame, as viewed in FIG. 3. This ensures that either of the upper or lower frame as desired may be used as an openable supporting means when the mirror of the present invention is used in such a position as shown in FIGURE 2. Also, such construction of the frame members permits any side thereof to be used as the supporting base on support means such as desk or table. Also, each of the two frame members 4 and 5 is initially formed with its ends spaced apart a distance shorter than that between said diametrically opposite points on the periphery of the mirror member. It should be noted here that the two frame members 4 and 5 are outwardly expanded at their respective ends so that those ends can peripherally embrace the mirror member so as to achieve their journalling thereto as shown in FIG. 3. Such outward expansion of the frame members creates an inward resilient force which in turn causes the journalled ends of each frame to return to its original position. As the result, on the left-hand side as viewed in FIG. 3, the inner journalled end 6 is pressed into contact with the corresponding peripheral side surface of the mirror member through the washer 9 and the outer journalled end 7 also presses said end 6 inwardly. The similar relation holds on the right-hand side in FIG. 3, that is, the outer end 7 inwardly presses the inner end 6 which in turn is brought into tight press contact with the corresponding peripheral side surface of the mirror member through the washer 9.

In this way the mirror of this invention can maintain the position as a pocket-mirror as shown in FIG. 3. If it is desired to use the mirror as a desk-type one, as shown in FIGS. 1 and 2, the upper frame member 5 may be intensely forced to be rotated so as to take a suitable supporting position. Moreover, such supporting position of the upper frame member 5 could not be destroyed unless a strong force is applied thereto. Additionally, the markedly greater width at the rounded corners of each frame member, which are most subject to the resiliency-producing inner stress, helps to produce a great resilient force for a slight distortion as well as to produce a durable resiliency and ensures a long life of the frame structure. In addition, the relatively great width at the journalled ends of the frame members which is provided by the inner circular periphery and outer angular periphery of the frame helps to greatly facilitate the designing and machining for the overlapping connection of the upper and lower frame members to the mirror member.

What I claim is:

1. A pocket-mirror comprising a circular mirror member, and upper and lower semi-circular frame members forming a framework around said mirror member and journalled at their ends to the mirror member at two diametrically opposed points on its periphery, each of said semi-circular frame members having a substantial width and being formed with a semi-circular inner peripheral side surface and a substantially equilateral trapezoidal outer peripheral side surface, said substantially trapezoidal outer peripheral surfaces of said frame members cooperating to form a substantially regular hexagon when said two frame members are in the closed position, each of said frame members being initially formed such that the distance between the journalled ends thereof is shorter than the distance between said two diametrically opposed points on the periphery of said mirror member, whereby the ends of said two frame members are pressed into contact with peripheral surface of said mirror member by the inward resilient force due to the expansion distortion at the journalled ends.

References Cited

UNITED STATES PATENTS

| | | | |
|---|---|---|---|
| 2,016,349 | 10/1935 | Solomon | 40—152.1 |
| 2,140,666 | 12/1938 | Chmielewski et al. | 40—152.1 |
| 3,179,361 | 4/1965 | O'Brien | 248—472 |

FOREIGN PATENTS

| | | |
|---|---|---|
| 453,822 | 12/1949 | Italy. |

ROY D. FRAZIER, Primary Examiner

FRANK DOMOTOR, Assistant Examiner